United States Patent
Hansen

(10) Patent No.: US 7,117,239 B1
(45) Date of Patent: Oct. 3, 2006

(54) REPORTING THE STATE OF AN APPARATUS TO A REMOTE COMPUTER

(75) Inventor: James R. Hansen, Franklin, MA (US)

(73) Assignee: Axeda Corporation, Foxboro, MA (US)

( * ) Notice: Subject to any disclaimer, the term of this patent is extended or adjusted under 35 U.S.C. 154(b) by 488 days.

(21) Appl. No.: 09/708,384

(22) Filed: Nov. 8, 2000

Related U.S. Application Data

(63) Continuation-in-part of application No. 09/627,201, filed on Jul. 28, 2000, now Pat. No. 6,757,714.

(51) Int. Cl.
*G06F 15/16* (2006.01)

(52) U.S. Cl. ...................................... 709/200; 709/206

(58) Field of Classification Search .............. 709/223, 709/224–232, 200–206, 228, 219, 222, 218, 709/217, 247, 318; 707/3, 5; 710/1; 370/252; 358/1.15; 717/171; 434/322
See application file for complete search history.

(56) References Cited

U.S. PATENT DOCUMENTS

| | | | |
|---|---|---|---|
| 4,086,434 A | 4/1978 | Bocchi | |
| 4,412,292 A | 10/1983 | Sedam et al. | |
| 4,497,037 A | 1/1985 | Kato et al. | |
| 4,583,834 A | 4/1986 | Seko et al. | |
| 4,853,946 A | 8/1989 | Elliott et al. | |
| 4,962,368 A | 10/1990 | Dobrzanski et al. | |
| 4,964,065 A | 10/1990 | Hicks et al. | |
| 4,965,946 A | 10/1990 | Hegedus et al. | |
| 4,996,703 A | 2/1991 | Gray | |
| 5,038,319 A | 8/1991 | Carter et al. | |
| 5,057,866 A | 10/1991 | Hill, Jr. et al. | |
| 5,077,582 A | 12/1991 | Kravette et al. | |
| 5,084,875 A | 1/1992 | Weinberger et al. | |
| 5,129,080 A | 7/1992 | Smith | |
| 5,138,377 A | 8/1992 | Smith et al. | |
| 5,184,179 A | 2/1993 | Tarr et al. | |
| 5,204,699 A | 4/1993 | Birnbaum et al. | |
| 5,212,645 A | 5/1993 | Wildes et al. | |
| 5,214,772 A | 5/1993 | Weinberger et al. | |
| 5,216,461 A | 6/1993 | Maekawa et al. | |
| 5,220,380 A | 6/1993 | Hirata et al. | |
| 5,224,157 A | 6/1993 | Yamada et al. | |
| 5,243,382 A | 9/1993 | Takano et al. | |
| 5,257,069 A | 10/1993 | Hirata et al. | |
| 5,261,061 A | 11/1993 | Ju | |
| 5,270,775 A | 12/1993 | Suzuki | |
| 5,282,127 A | 1/1994 | Mii | |

(Continued)

FOREIGN PATENT DOCUMENTS

JP            60-263162           12/1985

(Continued)

OTHER PUBLICATIONS webMethods B2B Whitepaper; www.cs.wisc.edu/~vganti/papers/b2b_wpB2Bintegration.html.*

(Continued)

*Primary Examiner*—Thong Vu
(74) *Attorney, Agent, or Firm*—Fish & Richardson P.C.

(57) ABSTRACT

The state of an apparatus is reported to a remote computer using an embedded device in the apparatus. The embedded device detects the state, generates a message that reports the state using a self-describing computer language, and sends the message to the remote computer. The remote computer receives the message and extracts the state of the embedded device from the message.

37 Claims, 4 Drawing Sheets

U.S. PATENT DOCUMENTS

| | | | |
|---|---|---|---|
| 5,291,244 | A | 3/1994 | Kajiwara et al. |
| 5,293,196 | A | 3/1994 | Kaneko et al. |
| 5,297,034 | A | 3/1994 | Weinstein |
| 5,297,256 | A | 3/1994 | Wolstenholme et al. |
| 5,300,980 | A | 4/1994 | Maekawa et al. |
| 5,303,005 | A | 4/1994 | Takano et al. |
| 5,305,055 | A | 4/1994 | Ebner et al. |
| 5,305,199 | A | 4/1994 | LoBiondo et al. |
| 5,307,263 | A | 4/1994 | Brown |
| 5,325,156 | A | 6/1994 | Ulinski |
| 5,333,286 | A | 7/1994 | Weinberger et al. |
| 5,335,048 | A | 8/1994 | Takano et al. |
| 5,339,168 | A | 8/1994 | Evanitsky et al. |
| 5,342,037 | A | 8/1994 | Martin |
| 5,347,346 | A | 9/1994 | Shimizu et al. |
| 5,359,391 | A | 10/1994 | Kuroyanagi et al. |
| 5,361,265 | A | 11/1994 | Weinberger et al. |
| 5,365,310 | A | 11/1994 | Jenkins et al. |
| 5,367,667 | A | 11/1994 | Wahlquist et al. |
| 5,369,469 | A | 11/1994 | Leo et al. |
| 5,369,471 | A | 11/1994 | Yamada |
| 5,369,472 | A | 11/1994 | Raj et al. |
| 5,373,349 | A | 12/1994 | Ito |
| 5,384,622 | A | 1/1995 | Hirata et al. |
| 5,386,271 | A | 1/1995 | Maekawa et al. |
| 5,392,095 | A | 2/1995 | Siegel |
| 5,398,257 | A | 3/1995 | Groenteman |
| 5,404,199 | A | 4/1995 | Hirata et al. |
| 5,412,779 | A | 5/1995 | Motoyama |
| 5,414,494 | A | 5/1995 | Aikens et al. |
| 5,420,667 | A | 5/1995 | Kaneko et al. |
| 5,424,808 | A | 6/1995 | Maekawa et al. |
| 5,424,844 | A | 6/1995 | Koyanagi et al. |
| 5,428,551 | A | 6/1995 | Trainor et al. |
| 5,442,541 | A | 8/1995 | Hube et al. |
| 5,444,517 | A | 8/1995 | Nagashima |
| 5,444,851 | A * | 8/1995 | Woest ........................ 709/222 |
| 5,446,522 | A | 8/1995 | Tahara et al. |
| 5,452,057 | A | 9/1995 | Imaizumi et al. |
| 5,459,552 | A | 10/1995 | Ohira |
| 5,463,775 | A | 10/1995 | DeWitt et al. |
| 5,469,353 | A | 11/1995 | Pinsky et al. |
| 5,488,454 | A | 1/1996 | Fukada et al. |
| 5,491,535 | A | 2/1996 | Hirata et al. |
| 5,493,364 | A | 2/1996 | Kuroyanagi et al. |
| 5,517,491 | A * | 5/1996 | Nanni et al. ................. 370/252 |
| 5,543,892 | A | 8/1996 | Hirata et al. |
| 5,548,376 | A | 8/1996 | Kikuno |
| 5,550,957 | A | 8/1996 | Davidson, Jr. et al. |
| 5,555,191 | A | 9/1996 | Hripcsak |
| 5,561,501 | A | 10/1996 | Honma |
| 5,572,672 | A | 11/1996 | Dewitt et al. |
| 5,586,254 | A | 12/1996 | Kondo et al. |
| 5,594,529 | A | 1/1997 | Yamashita et al. |
| 5,600,403 | A | 2/1997 | Inoo |
| 5,603,060 | A | 2/1997 | Weinberger et al. |
| 5,603,323 | A | 2/1997 | Pflugrath et al. |
| 5,619,024 | A | 4/1997 | Kolls |
| 5,631,724 | A | 5/1997 | Sawada et al. |
| 5,636,008 | A | 6/1997 | LoBiondo et al. |
| 5,636,333 | A | 6/1997 | Davidson, Jr. et al. |
| 5,638,427 | A | 6/1997 | Flemming et al. |
| 5,640,495 | A | 6/1997 | Colbert et al. |
| 5,642,202 | A | 6/1997 | Williams et al. |
| 5,642,208 | A | 6/1997 | Takahashi et al. |
| 5,655,084 | A | 8/1997 | Pinsky et al. |
| 5,659,794 | A * | 8/1997 | Caldarale et al. ............. 710/1 |
| 5,673,190 | A | 9/1997 | Kahleck et al. |
| 5,675,744 | A | 10/1997 | Tsujii |
| 5,677,775 | A | 10/1997 | Yamaguchi et al. |
| 5,694,528 | A | 12/1997 | Hube |
| 5,699,494 | A | 12/1997 | Colbert et al. |
| 5,708,908 | A | 1/1998 | Hirata et al. |
| 5,708,909 | A | 1/1998 | Yamashita et al. |
| 5,715,393 | A | 2/1998 | Naugle |
| 5,715,496 | A | 2/1998 | Sawada et al. |
| 5,715,823 | A | 2/1998 | Wood et al. |
| 5,720,015 | A | 2/1998 | Martin et al. |
| 5,727,135 | A | 3/1998 | Webb et al. |
| 5,732,212 | A | 3/1998 | Perholtz et al. |
| 5,736,965 | A | 4/1998 | Mosebrook et al. |
| 5,740,801 | A | 4/1998 | Branson |
| 5,745,268 | A | 4/1998 | Eastvold et al. |
| 5,748,907 | A | 5/1998 | Crane |
| 5,752,125 | A | 5/1998 | Yamashita et al. |
| 5,752,128 | A | 5/1998 | Yamashita |
| 5,752,917 | A | 5/1998 | Fuchs |
| 5,761,529 | A | 6/1998 | Raji et al. |
| 5,764,918 | A | 6/1998 | Poulter |
| 5,768,516 | A | 6/1998 | Sugishima |
| 5,772,585 | A | 6/1998 | Lavin et al. |
| 5,774,052 | A | 6/1998 | Hamm et al. |
| 5,786,994 | A | 7/1998 | Friz et al. |
| 5,787,149 | A | 7/1998 | Yousefi et al. |
| 5,787,278 | A | 7/1998 | Barton et al. |
| 5,790,793 | A | 8/1998 | Higley |
| 5,790,977 | A | 8/1998 | Exekiel |
| 5,798,738 | A | 8/1998 | Yamada |
| 5,801,964 | A | 9/1998 | McCarthy |
| 5,809,237 | A | 9/1998 | Watts et al. |
| 5,812,397 | A | 9/1998 | Pech et al. |
| 5,812,874 | A | 9/1998 | Yamashita et al. |
| 5,818,603 | A | 10/1998 | Motoyama |
| 5,819,015 | A | 10/1998 | Martin et al. |
| 5,819,110 | A | 10/1998 | Motoyama |
| 5,822,221 | A | 10/1998 | Groenteman |
| 5,828,943 | A | 10/1998 | Brown |
| 5,835,816 | A | 11/1998 | Sawada et al. |
| 5,844,550 | A | 12/1998 | Trainor et al. |
| 5,845,230 | A | 12/1998 | Lamberson |
| 5,857,967 | A | 1/1999 | Frid et al. |
| 5,862,404 | A | 1/1999 | Onaga |
| 5,865,745 | A | 2/1999 | Schmitt et al. |
| 5,872,635 | A | 2/1999 | Akiyama |
| 5,873,009 | A | 2/1999 | Yamashita et al. |
| 5,873,659 | A | 2/1999 | Edwards et al. |
| 5,878,746 | A | 3/1999 | Lemelson et al. |
| 5,880,677 | A | 3/1999 | Lestician |
| 5,884,072 | A * | 3/1999 | Rasmussen ................. 709/223 |
| 5,887,216 | A | 3/1999 | Motoyama |
| 5,890,029 | A | 3/1999 | Hirata et al. |
| 5,894,416 | A | 4/1999 | Kuroyanagi et al. |
| 5,897,235 | A | 4/1999 | Honma |
| 5,901,286 | A | 5/1999 | Danknick et al. |
| 5,905,906 | A | 5/1999 | Goffinet et al. |
| 5,909,493 | A | 6/1999 | Motoyama et al. |
| 5,911,095 | A | 6/1999 | Atsumi et al. |
| 5,917,405 | A | 6/1999 | Joao |
| 5,933,675 | A | 8/1999 | Sawada et al. |
| 5,935,060 | A | 8/1999 | Iliff |
| 5,956,487 | A | 9/1999 | Venkatraman et al. |
| 5,956,698 | A | 9/1999 | Lachese et al. |
| 5,968,116 | A | 10/1999 | Day et al. |
| 5,970,149 | A | 10/1999 | Johnson |
| 5,975,737 | A | 11/1999 | Crater et al. |
| 6,003,061 | A | 12/1999 | Jones et al. |
| 6,003,078 | A | 12/1999 | Kodimer et al. |
| 6,006,045 | A | 12/1999 | Miyawaki |
| 6,009,284 | A | 12/1999 | Weinberger et al. |
| 6,012,088 | A | 1/2000 | Li et al. |
| 6,014,631 | A | 1/2000 | Teagarden et al. |
| 6,014,691 | A | 1/2000 | Brewer et al. |
| 6,021,284 | A | 2/2000 | Serizawa et al. |
| 6,022,315 | A | 2/2000 | Iliff |

| | | |
|---|---|---|
| 6,023,223 A | 2/2000 | Baxter, Jr. |
| 6,023,507 A | 2/2000 | Wookey |
| 6,025,925 A | 2/2000 | Davidson, Jr. et al. |
| 6,031,964 A | 2/2000 | Anderson |
| 6,042,111 A | 3/2000 | Rivers et al. |
| 6,060,994 A | 5/2000 | Chen |
| 6,061,603 A | 5/2000 | Papadopoulos et al. |
| 6,064,915 A | 5/2000 | Kaneko et al. |
| 6,088,718 A * | 7/2000 | Altschuler et al. .......... 709/203 |
| 6,091,915 A | 7/2000 | Takagishi |
| 6,098,116 A | 8/2000 | Nixon et al. |
| 6,101,407 A | 8/2000 | Groezinger |
| 6,108,492 A | 8/2000 | Miyachi |
| 6,112,035 A | 8/2000 | Kuroyanagi et al. |
| 6,112,256 A | 8/2000 | Goffinet et al. |
| 6,115,489 A | 9/2000 | Gupta et al. |
| 6,119,934 A | 9/2000 | Kolls |
| 6,122,463 A | 9/2000 | Nagatani |
| 6,130,999 A | 10/2000 | Serizawa et al. |
| 6,139,177 A | 10/2000 | Venkatraman et al. |
| 6,152,365 A | 11/2000 | Kolls |
| 6,167,448 A | 12/2000 | Hemphill et al. |
| 6,181,331 B1 | 1/2001 | Trainor et al. |
| 6,189,113 B1 | 2/2001 | Rabb et al. |
| 6,196,735 B1 | 3/2001 | Inamine |
| 6,221,011 B1 | 4/2001 | Bardy |
| 6,230,199 B1 | 5/2001 | Revashetti et al. |
| 6,246,485 B1 | 6/2001 | Brown et al. |
| 6,260,148 B1 | 7/2001 | Aggarwal et al. |
| 6,260,248 B1 | 7/2001 | Cramer et al. |
| 6,282,454 B1 | 8/2001 | Papadopoulos et al. |
| 6,286,059 B1 | 9/2001 | Sugiura |
| 6,292,828 B1 * | 9/2001 | Williams .................... 709/218 |
| 6,304,895 B1 | 10/2001 | Schneider et al. |
| 6,311,024 B1 | 10/2001 | Serizawa et al. |
| 6,312,378 B1 | 11/2001 | Bardy |
| 6,317,783 B1 | 11/2001 | Freishtat et al. |
| 6,317,848 B1 | 11/2001 | Sorens et al. |
| 6,325,540 B1 | 12/2001 | Lounsberry et al. |
| 6,343,320 B1 * | 1/2002 | Fairchild et al. ............ 709/224 |
| 6,356,933 B1 * | 3/2002 | Mitchell et al. ............ 709/203 |
| 6,356,949 B1 | 3/2002 | Katsandres et al. |
| 6,368,284 B1 | 4/2002 | Bardy |
| 6,370,582 B1 | 4/2002 | Lim et al. |
| 6,377,162 B1 | 4/2002 | Delestienne et al. |
| 6,381,557 B1 | 4/2002 | Babula et al. |
| 6,397,212 B1 * | 5/2002 | Biffar ............................ 707/5 |
| 6,405,310 B1 | 6/2002 | Simpson |
| 6,406,426 B1 | 6/2002 | Reuss et al. |
| 6,415,023 B1 | 7/2002 | Iggulden |
| 6,426,798 B1 | 7/2002 | Yeung |
| 6,430,711 B1 | 8/2002 | Sekizawa et al. |
| 6,434,572 B1 | 8/2002 | Derzay et al. |
| 6,437,692 B1 | 8/2002 | Petite et al. |
| 6,446,192 B1 | 9/2002 | Narasimhan et al. |
| 6,449,633 B1 | 9/2002 | Van et al. |
| 6,457,038 B1 | 9/2002 | Defosse |
| 6,462,831 B1 | 10/2002 | Akiyama |
| 6,466,971 B1 | 10/2002 | Humpleman et al. |
| 6,471,521 B1 * | 10/2002 | Dornbush et al. .......... 434/322 |
| 6,477,117 B1 | 11/2002 | Narayanaswami et al. |
| 6,487,513 B1 | 11/2002 | Eastvold et al. |
| 6,494,831 B1 | 12/2002 | Koritzinsky |
| 6,510,350 B1 * | 1/2003 | Steen et al. .................... 700/9 |
| 6,523,063 B1 * | 2/2003 | Miller et al. ................ 709/206 |
| 6,523,130 B1 | 2/2003 | Hickman et al. |
| 6,529,848 B1 | 3/2003 | Sone |
| 6,549,612 B1 | 4/2003 | Gifford et al. |
| 6,560,611 B1 | 5/2003 | Nine et al. |
| 6,560,656 B1 | 5/2003 | O'Sullivan et al. |
| 6,564,227 B1 | 5/2003 | Sakakibara et al. |
| 6,581,092 B1 * | 6/2003 | Motoyama et al. ......... 709/219 |
| 6,581,094 B1 | 6/2003 | Gao |
| 6,587,812 B1 | 7/2003 | Takayama |
| 6,598,011 B1 | 7/2003 | Koritzinsky et al. |
| 6,601,159 B1 | 7/2003 | Smith et al. |
| 6,604,212 B1 | 8/2003 | Sekizawa et al. |
| 6,611,863 B1 | 8/2003 | Banginwar |
| 6,631,407 B1 | 10/2003 | Mukaiyama et al. |
| 6,636,899 B1 | 10/2003 | Rabb et al. |
| 6,651,110 B1 | 11/2003 | Caspers et al. |
| 6,651,190 B1 | 11/2003 | Worley et al. |
| 6,654,720 B1 | 11/2003 | Graham et al. |
| 6,654,726 B1 * | 11/2003 | Hanzek ....................... 705/26 |
| 6,670,810 B1 | 12/2003 | Duncan et al. |
| 6,681,349 B1 | 1/2004 | Sekizawa |
| 6,686,838 B1 | 2/2004 | Rezvani et al. |
| 6,691,106 B1 * | 2/2004 | Sathyanarayan ............... 707/3 |
| 6,710,893 B1 | 3/2004 | Hou et al. |
| 6,711,618 B1 * | 3/2004 | Danner et al. .............. 709/228 |
| 6,757,714 B1 * | 6/2004 | Hansen ....................... 709/206 |
| 6,785,015 B1 * | 8/2004 | Smith et al. ................ 358/1.15 |
| 6,834,298 B1 | 12/2004 | Singer et al. |
| 6,857,013 B1 | 2/2005 | Ramberg et al. |
| 6,904,593 B1 * | 6/2005 | Fong et al. .................. 717/171 |
| 2002/0006790 A1 | 1/2002 | Blumeenstock et al. |
| 2002/0038320 A1 | 3/2002 | Brook |
| 2002/0064138 A1 | 5/2002 | Saito et al. |
| 2003/0118353 A1 | 6/2003 | Baller |

FOREIGN PATENT DOCUMENTS

| | | |
|---|---|---|
| JP | 06-062130 | 3/1994 |
| JP | 06062130 | 3/1994 |
| JP | 07325513 | 12/1995 |
| JP | 09163008 | 6/1997 |
| JP | 10190922 | 7/1998 |
| JP | 10224372 | 8/1998 |
| JP | 10-295788 | 4/2000 |
| JP | 2000-122952 | 4/2000 |
| JP | 200122952 | 4/2000 |
| WO | WO98/20439 | 5/1998 |
| WO | WO 98/20439 | 5/1998 |
| WO | WO98/33302 | 7/1998 |
| WO | WO 98/38910 | 9/1998 |
| WO | WO98/38910 | 9/1998 |
| WO | WO 98/41943 | 9/1998 |
| WO | WO98/41943 | 9/1998 |
| WO | WO 99/21336 | 4/1999 |
| WO | WO99/21336 | 4/1999 |
| WO | WO 99/57649 | 11/1999 |
| WO | WO 99 57649 | 11/1999 |
| WO | WO 99/57837 | 11/1999 |
| WO | WO 99 57838 | 11/1999 |
| WO | WO 99/57838 | 11/1999 |
| WO | WO 00/23894 | 4/2000 |
| WO | WO 02/10919 | 2/2002 |
| WO | WO02/10919 | 2/2002 |
| WO | WO 02/21239 | 3/2002 |
| WO | WO 02/21299 | 3/2002 |
| WO | WO02/21414 | 3/2002 |
| WO | WO 02/21414 | 3/2002 |
| WO | WO 02/21415 | 3/2002 |
| WO | WO 02/21777 | 3/2002 |
| WO | WO 02/25501 | 3/2002 |
| WO | WO02/25501 | 3/2002 |
| WO | WO 98/33302 | 3/2002 |

OTHER PUBLICATIONS virtual reality transfer protocol (vrtp); www.stl.nps.navy.mil/~brutzman/vrtp.*
The Simple Times, vol. 7, No. 1, Mar. 1999; www.simple-times.org/pub/simple-times/issues/7-1.html.*
Math Markup Language (Chapter 4); www.w3.org/TR/REC-MathML/chap4_4.html.*

Memphis Educational Computer Connectivity Alliance (MECCA) www.mecca.org/~ltague/nsfnocostextension.html.*
EBITS: Electronic Business & Information Technology for Society Research Consortium www.cs.dartmouth.edu/~makedon/cs188/proposal.html.*
Distributed and scalable XML document processing architecture for E-commerce systems Cheung, D.; Lee, S.D.; Lee, T.; Song, W.; Tan, C.J.; Advanced Issues of E-Commerce and Web-Based Information Systems, 2000. WECWIS 2000. Second International Workshop on Jun. 8-9, 2000, pp. 152-157.*
A knowledge sharing and collaboration system model based on Internet Wu Gangshan; Huang Yuan; Shian-Shyong Tseng; Zhang Fuyan; Systems, Man, and Cybernetics, 1999. IEEE SMC '99 Conference Proceedings. 1999 IEEE International Conference on vol. 2, Oct. 12-15, 1999 pp. 148-152 vol. 2.*
A Evolution of Workflow Standards, IEEE 1999.*
Active hypertext for distributed Web applications Koppen, E.; Neumann, G.; Enabling Technologies: Infrastructure for Collaborative Enterprises, 1999. (WET ICE '99) Proceedings. IEEE 8th International Workshops on Jun. 16-18, 1999 pp. 297-302.*
http://www.upnp.org/download/UPnPDA10_20000613.htm (pp. 1-52).
Office Action dated Nov. 17, 2003; from U.S. Appl. No. 09/627,201.
CORBA and XML Integration in Enterprise Systems—Ennis (2000); www.iona.com/info/techcenter/ecoop2000apr17.pdf.
Implementing Incremental Code Migration with XML, Emmerich, W. et al, IEEE, 4-11, Jun. 2000.
XML-based Data System for Earth Science Applications, Suresh, R et al.; IEEE 2000 Internation, vol. 3, pp. 242-28, Jul. 2000.
Office Action dated Jan. 29, 2004 in counterpart European Application No. 01 955 993.9-2211.
Search Report from EP Application No. 01955993.9, dated Dec. 16, 2004.
Incremona, A., "Remote Service Diagnostics for Imaging Equipment: Today and Tomorrow," *Advanced Imaging*, 12(9):90(2) (1997).
Lassman, M. et al., "Modern Nuclear Medical Diagnostics with Efficient Gamma Cameras," *Electromedica*, 66(2):43-51 (1998).
"Siemens Medical, BJC Health System Extend deal to multivendor service," Medical Imaging News, vol. 6, No. 26, Jun. 27, 1997.
Mar. 8, 2005 Office Action from application 01 973 431.8.
Math Markup Language (Chapter 4): www.w3.org/TR/REC-MathML/chap4_4.html.
Memphis Educational Computer Connectivity Alliance (MECCA) www.mecca.org/~ltague/nsfnocostextension.html.
EBITS: Electronic Business & Information Technology for Society Research Consortium www.cs.dartmouth.edu/~makedon/cs188/proposal.html.
Xerox 190 Copier, Electronic Data Interface Operator Guide, ver. 1.0, 1989.
Lindley, David, "Xerox unveils copier that phones for help," Rochester Democrat and Chronicle, Mar. 28 ,1990.
Rytting, Todd, "Dispensing the Goods, Embedded Style," Circuit Cellar Online, Oct. 1999.
Ennis, Darach, "Cobra and XML Integration in Enterprise Systems," Trinity College Dublin, IONA Technologies Inc.
Emmerich et al., "Implementing Incremental Code Migration with XML," University College London, 2000.
Suresh et al., "XML-Based Data Systems for Earth Science Applications," Raytheon Information Technology and Scientific Services, Lanham, MD, 2000.
Oct. 6, 1998, "Frequently Asked Questions about the Extensible Markup Language—The XML FAQ" Version 1.41 (http://www.oasis-open.org/cover/xmlFAQ141-19981006.html).
Jun. 20, 1997, Layman, et al., "XML-Data," Position Paper from Microsoft Corp. (http://www.oasis-open.org/cover/xml-data9706223.html).
Pfeiffer, R., "Tutorial 2: Writing XML Documents," 1999.
Luh, James C., "With several specs complete, XML enters widespread development," Internet World, Jan. 4, 1999.
Kimball, Ralph, "XML Will Make it Easier," Intelligent Enterprise (http://www.intelligententerprise.com/010507/webhouse1_1.jhtml).
Kovar, Joseph, "Xerox Unveils Expanded Channel Lineup; Also Plans to Introduce E-Mail, Queue Management Software," PC Expo, Jun. 18, 1999.
EmWare Press Release: "Motorola, Mitsubishi and National Semiconductor Join emWare's Embed The Internet Alliance," Chicago, IL, Mar. 2, 1999.
EmWare Press Release: "emWare's emLink (TM) Used to Internet-enable Welch Allyn's Vital Signs Monitor," Chicago, IL Mar. 2, 1999.
EmWare Press Release: "emWare, IBM Demonstrate Next Phase in Establishing Worldwide Access to Embedded Devices," Chicago, IL Mar. 2, 1999.
EmWare Press Release: "Invensys Selects emWare EMIT Device-Networking Software to Add Remote Monitoring and Control Capabilities to its Controller Products," Salt Lake City, Utah Jun. 14, 1999.
EmWare Press Release: "emWare Delivers EMIT 3.0 SDK Pro-A Complete Device Networking Kit for Developing End-to-end, Embedded Device Networking Solutioins," Salt Lake City, Utah May 24, 1999.
EmWare Press Release: "emWare Announces Support for Sun Microsystems Jini Technology," Salt Lake City, Utah Feb. 17, 1999.
Trewitt, G., "Digital Network Systems Laboratory, NSL Technical Note TN-14, Using Tcl to Process HTML Forms".
Jennyc, Kenn S., "Linking Enterprise Business Systems to the Factory Floor," The Hewlett-Packard Journal, Article 9, May 1998.
Walsh, Norman, "XSL The Extensible Style Language: Styling XML Documents," New Architect Daily, Jan. 1999.
Pfeiffer, R., "XML Tutorials for Programmers: Tutorial 2: Writing XML Documents," (http://imb.com/xml).
Winer, Dave, "XML-RPC Specification," (http://XML-RPC.com), Jun. 15, 1999.
Layman, A, et al., "XML-Data," Microsoft Position Paper, Jun. 20, 1997 (http://www.oasis-open.org/cover/xml-data9706223.html).
Sep. 1995, *Medical Imaging*, East Providence, RI.
Eastvold, Roger, "Tiss and Tell," Medical Imaging, Sep. 1995.
Nov. 1996, *24×7*, HealthTech Publishing Company, Inc.
Wigget, Jeremy, "Intraview: Roger Eastvold of Orasis Inc.," *24×7*, Nov. 1996.
Dec. 27, 1995, *SCAN Diagnostic Imaging*, vol. 8, No. 24.
Winter 1992, *Field of View*, vol. 2, No. 3, Toshiba America Medical System, Inc.
Reagan, Kelly, "Technology for the Soul," OC Metro, Sep. 1, 1995.
"Remote Diagnostics: Strategic weapon in the war for multi-vendor service contracts," Tech Assessment, vol. 3, No. 12, Dec. 1995.
Eastvold, Roger, "Services: The Next Generation," The Professional Journal, vol. 20, No. 4.
Apr. 22, 2005 Literature Search by Keyword: CyberTAC.
Steinfeld, E., "Making the Change from Standalone to Internet Appliance," Circuit Cellar Online, Apr. 2000, pp. 1-7.
Allegro, RomWebCLient Embedded HTTP client Toolkit: ALLEGROSOFT, Circuit Cellar Online, Sep. 7, 2000, pp. 1-2, XP-002201983, URL:http://web.archive.orgweb/20000709204234/http://www.allegrosoft.com/romwebclient.html.
"Allegro Software product release overview," Greenhills Software Inc., Jun. 10, 2002, p. 1, URL:http://www.ghs.com/partners/allegro/.
European Office Action mailed Jun. 6, 2005 for Application No. 01955993.9-2211/1305712.
Questra Preliminary Invalidity Contentions dated Apr. 29, 2005.
Box et al., Simple Object Acces Protocol (SOAP) 1.1 Document No. XP002250270, May 8, 2000.
XP-002253876, c:\epodata\sea\eplogf\internal.log.
Issue 77: The Next Bang: The Expolosive Combination of Embedded Linuz, XML, and Instant Mess, http://www.linuxjournal.com/article.php?sid=4195, pp. 1-15.
CyberTAC & RadScape Presentation, May 1997.
CyberTAC from Virtual Impact Systems, Inc. Presentation.
CyberTAC Remote Support System Presentation.
Questra Applications Data Sheet.
CyberTAC Design Presentation.
Orasis Medical Services, Inc., Business Plan Copy No. 001, Nov. 1995.

McBride, R.A., "Security Considerations for Active Messages," ACM SIGICE Bulletin, vol. 22 (2), Oct. 1996.

Hanckmann, J., "Telescript: the emerging standard for intelligent messaging," Philips Telecommunications Review, vol. 52(1).

Lassman, M. et al., "Modern Nuclear Medical Diagnostics with Efficient Gamma Cameras," Electromedica 66(2):43-51 (1998).

Incremona, A. "Remote Service Diagnostics for Imaging Equipment: Today and Tomorrow," Advanced Imaging, 12(9):90(2) (1997).

"The Simple Times, The Quarterly Newsletter of SNMP Technology, Comment, and Events," vol. 7, No. 1, Mar. 1999; wwww.simple-times.org/pub/simple-times/issues/7-1.html.

Tom Williams, "Java Goes to Work Controlling Networked Embedded Systems," Computer Designes, Pennwell Publ. Littleton, MA 35:9:36-37, Aug. 1996.

Edward F. Steinfeld, "Internet-appliance technology automates test equipment," EDN Magazine, pp. 157-169, Oct. 2000, www.edbmag.com.

Database WIP, Section EI, Week 200156, Abstract, Document No. XP002253876 (Korea Electronics & Telecom Res Inst.) Derwent Publications, Ltd., London, GB, Mar. 5, 2001.

WebMethods B2B Whitepaper; www.cs.wisc.edu/~vganti/papers/b2b_wpB2Bintegration.html.

Virtual Reality Transfer Protocol (VRTP); www.stl.nps.navy.mil/~brutzman/vrtp.

Lerner, R., "Introducing SOAP," Linux Journal, pp. 62-70, Mar. 2001.

Summons to attend oral proceedings in corresponding European Application No. 01955993.9 dated Oct. 31, 2005.

Result of Consultation of Nov. 24, 2005 and Nov. 25, 2005 from corresponding European Application No. 01955993.

Submission in German dated Nov. 25, 2005 from corresponding European Application No. 01955993.9.

Annex to EPO Form 2004 with claims for grant in Eurpoean Application No. 01955993.9.

Oral Proceeding Minutes with European Application No. 01955993.9.

Communication dated Apr. 26, 2005 in European Application No. 01955993.9.

International Search Report PCT/US01/23651.

Office Action dtd Jun. 22, 2004 from EPO App. 01996048.3.

Office Action dtd Aug. 5, 2004 from EPO App. 01955993.9.

Steinfeld, Edward, "Internet-appliance technology automates test equipment", EDN Magazine, pp. 157-169 (2000).

Williams, Tom, "Java Goes To Work Controlling Networked Embedded Systems", Computer Design, 35:9:36-37 (1996).

http://www.linuxjournal.com/article.php?sid=4195.

"RomWebClient Embedded HTTP client 1-61 Toolkit" ALLEGROSOFT, 'Online! Jul. 9, 2000 (2000-07-091, pp. 1-2, XPOO2201938 Retrieved from the Internet: <URL: http://web.archive.org/web/2000070920 4234/http://www.allegrosoft.com/romwebclient. html> retrieved on Jun. 12, 2002 the whole document.

Box, et al., Simple Object Acces Protocol (SOAP) 1.1, Document No. XP002250270, May 8, 2000.

Edward Steinfeld, "Making the Change" Document No. XP002201937, Apr. 2000, Circuit Cellar Online.

Allegro Software product release 1-61 overview Greenhills Software Inc., 'Online! Jun. 10, 2002 (2002-06-lo), pp. 1-1, XPOO2201939 Retrieved from the Internet: URL: http://www.ghs.com/partners/allegro/>' retrieved on Jun. 10, 2002! the whole document.

Database WIP, Section EI, Week 200156, Abstract, Document No. XP002253876 (Korea Electronics & Telecom Res Inst.) Derwent Publications, Ltd., London, GB, Mar. 5, 2001.

* cited by examiner

REPORTING THE STATE OF AN APPARATUS TO A REMOTE COMPUTER

CLAIM TO PRIORITY

This application is a continuation-in-part application of U.S. patent application Ser. No. 09/627,201, filed on Jul. 28, 2000 now U.S. Pat. No. 6,757,714 in the name of James R. Hansen.

BACKGROUND

This invention relates to using a device embedded in an apparatus (an "embedded device") to report the state of the apparatus to a remote computer.

An apparatus may contain an embedded device, such as a controller, to monitor and control its operation. Any type of apparatus may have an embedded device, including, but not limited to, home appliances, such as washing machines, dishwashers, and televisions, and manufacturing equipment, such as robotics, conveyors and motors.

Embedded devices are often connected to an internal network, such as a local area network (LAN), with an interface to the Internet. Other devices on the internal network may communicate with the embedded devices over the internal network.

SUMMARY

In general, in one aspect, the invention is directed to using a device embedded in an apparatus to report the state of the apparatus to a remote computer. This aspect of the invention features detecting the state of the apparatus, generating a message that reports the state of the apparatus using a self-describing computer language, and sending the message to the remote computer. An example of a self-describing computer language is eXtensible Markup Language (XML). Examples of messages that may be sent include an electronic mail (e-mail) message and a hypertext transfer protocol (HTTP) command, both containing XML code.

By virtue of the device-generated message, the remote computer can obtain the state of the apparatus even if the remote computer cannot directly address the embedded device. Thus, computers that cannot communicate directly with the embedded device, such as computers that are not on the same internal network as the embedded device, can still obtain the status of the apparatus. Moreover, because the state is reported using a self-describing computer language, the remote computer can interpret the state without the aid of a person. As a result, processes, such as maintenance and the like, can be scheduled automatically for the apparatus and/or embedded device by the remote computer.

This aspect of the invention may include one or more of the following features. The state is indicative of an error condition in the apparatus. The error condition is a variable that deviates from an acceptable value or a predetermined range of acceptable values. The function of detecting the state includes receiving the state from the apparatus by, e.g., retrieving the state periodically from the apparatus. The function of detecting the state includes obtaining an identifier for the apparatus, the identifier relating to the state of the apparatus, and using the embedded device to read the state from the apparatus using the identifier.

This aspect of the invention may also include determining if the state of the apparatus has changed. The message is generated if the state of the apparatus has changed and is not generated otherwise. The function of determining if the state of the apparatus has changed includes comparing the state received from the apparatus to a previous state of the apparatus.

The message is generated using a predefined template by obtaining one or more variables relating to the apparatus and inserting the one or more variables into the template. The state of the apparatus may be included as part of a body of an e-mail message or as part of an attachment to the e-mail message. The state of the apparatus may be included as part of an HTTP command.

In general, in another aspect, the invention is directed to obtaining a state of an apparatus from a device, such as a controller, embedded in the apparatus. This aspect of the invention features receiving a message that reports the state of the apparatus using a self-describing computer language and extracting the state of the apparatus from the message.

This aspect of the invention may include one or more of the following features. The self-describing computer language is XML. The state of the apparatus is indicative of an error condition in the apparatus. The error condition is a variable that deviates from an acceptable value or a predetermined range of acceptable values. The state of the apparatus is passed to a customer relationship management system. The message may be included in an HTTP command or may be part of an e-mail.

In general, in another aspect, the invention features a system that includes first and second devices. The first device includes circuitry that generates a message reporting a state of an apparatus using a self-describing computer language. The second device is in communication with the first device. The second device includes circuitry that receives the electronic mail message from the first device.

This aspect of the invention may include one or more of the following features. The second device receives the message from the first device and extracts the state of the apparatus from the message. The first device is embedded in the apparatus and the second device is a remote computer. The message may be included in an HTTP command or may be part of an e-mail.

Other features and advantages of the invention will become apparent from the following description, including the claims and drawings.

DESCRIPTION

Figure 1:
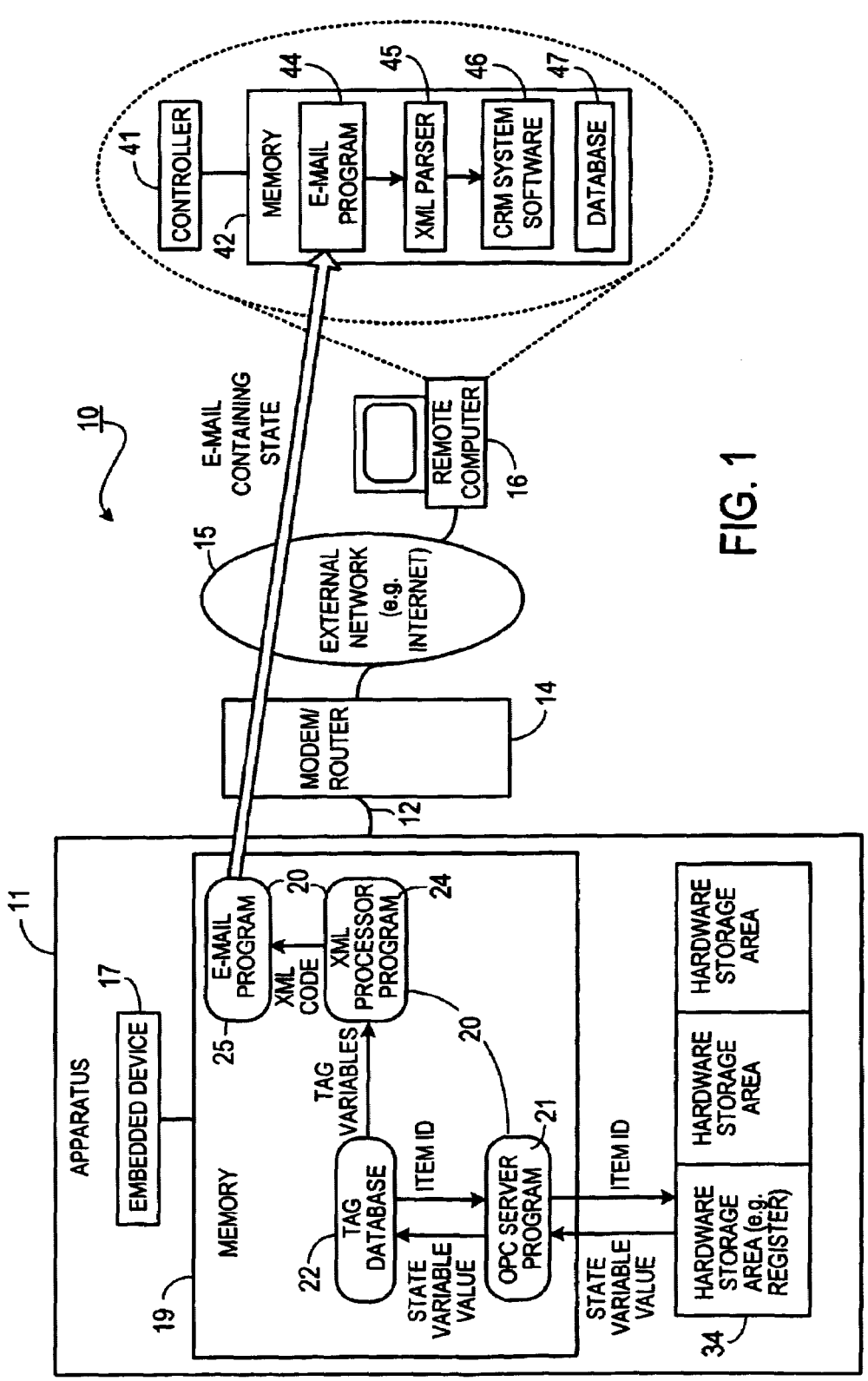
FIG. 1 is a block diagram of a network containing a remote computer and an apparatus having an embedded device.

FIG. 1 shows a network 10. Network 10 includes an apparatus 11 containing an embedded device 17, such as a controller (e.g., a microprocessor). Apparatus 11 is connected to an internal network 12, such as a LAN. A router or modem 14 interfaces internal network 12 to an external network 15, such as the Internet, that runs TCP/IP (Transmission Control Protocol/Internet Protocol) or some other suitable protocol. Connections may be, e.g., via Ethernet, wireless link, or telephone line. External network 15 contains remote computer 16, which may be a server, a personal computer (PC), or any other type of processing device. Other devices (not shown) may be included on internal network 12 and external network 15.

Processing in the Embedded Device

Apparatus 11 may be any type of device or may be included in any system having functions that are monitored and controlled by embedded device 17. Among other things, embedded device 17 executes software stored in memory 19 to generate and send, to remote computer 16, an e-mail message reporting the state of apparatus 11.

Software 20 includes an OPC (OLE for Process Control) server program 21, an XML (eXtensible Markup Language) processor program 24, and an e-mail program 25. E-mail program 25 is an SMTP-compliant (Simple Mail Transfer Protocol) program for sending e-mail from embedded device 17 to Internet addresses and for receiving e-mail from the Internet. E-mail program 25 operates as a mail transfer agent (MTA) for e-mail messages arriving at embedded device 17 and a mail delivery agent (MDA) for e-mail messages originating from embedded device 17. Other mail transfer protocols and programs may be also used by embedded device 17 in addition to, or instead of, those noted above.

XML processor program 24 is a program for generating XML code that reports the state of apparatus 11. XML is a self-describing computer language that defines variables and values relating to those variables. XML is self-describing in the sense that fields in the XML code identify variables and their values in the XML code. The template for XML used to generate an e-mail is as follows:

<name>temperature</name><value><##temperature##></value>, where the "name" field identifies the name of a variable and the "value" field identifies the value of the variable that follows the "name" field. So, for the example given above, the variable is "temperature" and a value (e.g., 33.8) may be inserted for that variable as follows:

<name>temperature</name><value>33.8</value>.

XML processor program 24 generates XML code having the above syntax from a tag database 22 stored in memory 19.

Figure 2:
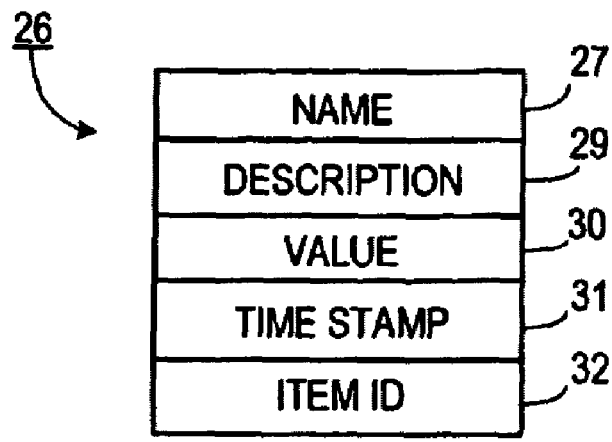
FIG. 2 shows the format of a tag used to store state variables for the apparatus.

Tag database 22 contains tags for use by XML processor program 24 in generating XML code. FIG. 2 shows an example of a format for a tag 26, although other formats may be used. Tag 26 contains a name field 27, a description field 29, a value field 30, a time stamp field 31, and an item identifier (ID) field 32. These fields are used to obtain, identify and store information relating to apparatus 11.

Name field 27 holds the name of a state variable for apparatus 11, such as "temperature", and description field 29 provides further identification information, such as "temperature of fluid in a tank". Value field 30 holds the value of the state variable and time stamp field 31 holds the time that the value in value field 30 was obtained. Value field 30 may include a variant, which is a construct that holds the value as an integer, a real number, a boolean, a character string, or some other type. Item ID field 32 holds an identifier that corresponds to hardware that is being monitored within apparatus 11. The identifier corresponds to a register location or to some other storage area of apparatus 11 that contains the value for field 30. For example, if embedded device 17 is in a robotics system, item ID field 32 might correspond to a register in the robotics system that contains a velocity or position of a robotic arm.

OPC server program 21 reads item IDs from field 32 and uses those item IDs to read variable values from corresponding hardware storage areas 34. OPC server program 21 implements an industrial automation protocol, such as MODBUS TCP, to communicate with the apparatus hardware. The system is not limited to use with the MODBUS protocol or with OPC server program 21; any drivers or computer programs may be used to read the state variable values from the hardware. Once a state variable value has been read, OPC server program 21 inserts the variable value into field 30 of the appropriate tag.

Figure 3:
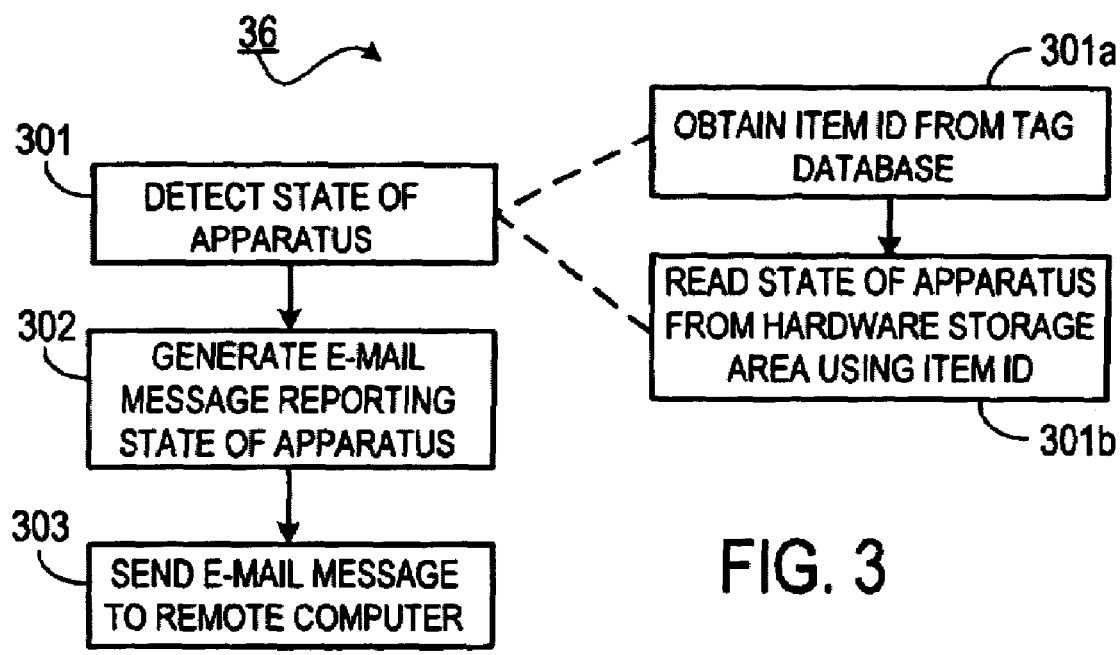
FIG. 3 is flowchart of a process performed by the embedded device to report the state of the apparatus to the remote computer.

FIG. 3 shows a process 36 for reporting the state of apparatus 11 to remote computer 16 using e-mail. In this embodiment, process 36 is implemented by OPC server program 21, XML processor program 24, e-mail program 25, and system software (not shown) executing in embedded device 17. The system software may include an operating system or other programs that control the background operation of embedded device 17.

Process 36 detects (301) the state of apparatus 11. The state may be indicative of an error condition (described below) within apparatus 11 or it may simply be state variables of apparatus 11 that are obtained at a particular time. To detect the state of apparatus 11, OPC server program 21 polls the hardware in apparatus 11 periodically. To perform this polling, OPC server program 21 obtains (301a) an item ID from tag database 22 and reads (301b) the value of a state variable that corresponds to the item ID from the appropriate hardware storage location. Process 36 may report the value to the remote computer as is or, alternatively, process 36 may use the value to identify and report an error condition in the hardware. A process for reporting error conditions is described below.

Process 36 generates (302) an e-mail message reporting the value of state variable(s) for apparatus 11. Specifically, XML processor program 24 retrieves both the name of each state variable and the value of the state variable from the appropriate tag(s) in tag database 22. Other variables may also be retrieved from tag database 22 including the time stamp, description, and whatever other variables are stored in tag database 22. Which information is retrieved is pre-set in XML processor program 24. The retrieved variables are used by XML processor program 24 to generate XML code for an e-mail to remote computer 16.

XML processor program 24 may generate the XML code "on the fly", meaning without the use of a template. In this case, a blank XML file is populated with the retrieved variables in XML format by XML processor program 24. Alternatively, XML processor program 24 may generate the XML code using a pre-defined and formatted template. The template may be obtained by XML processor program 24, e.g., from memory 19 or a remote storage location (not shown). For example, the template may contain formatting similar to that shown above, namely:

<name>temperature</name><value><##temperature##></value>.

To generate the XML code from the template, XML processor program 24 scans through the template and inserts state variable value(s) retrieved from tag database 22, where appropriate. XML processor program 24 may generate the XML code periodically, depending upon how often e-mails are to be sent to the remote computer. Alternatively, tag manager software (not shown) may be included to provide newly-received tag variables to XML processor program 24. In this case, XML processor program 24 generates the XML code when it receives the new tag variables.

The resulting XML code may be part of the body of an e-mail or it may part of an attachment to an e-mail. The e-mail also contains a unique identifier, such as a code (e.g., serial number or identifier), that identifies embedded device 17 to remote computer 16. E-mail program 25 obtains the XML code from XML processor program 24 and sends it to remote computer 16 as part of the e-mail message. E-mail program 25 obtains the code periodically, depending upon the frequency at which e-mails are to be sent to the remote computer. The frequency is set beforehand in embedded device 17. The address of the remote computer may be registered with e-mail program 25 beforehand. Typically, the address/remote computer will be that of an entity that requires information about apparatus 11. For example, the entity may be a manufacturer of the apparatus, a plant monitoring system, or the like. The e-mail program sends the message to router/modem 14, which transfers it via external network 15 to remote computer 16. Then, the e-mail message is processed as described below.

The foregoing describes the case where embedded device 17 simply reports the state of apparatus 11 to remote computer 16 periodically. Alternatively, embedded device 17 may report the state to remote computer 16 only when an error condition or "alarm" is detected.

Figure 4:
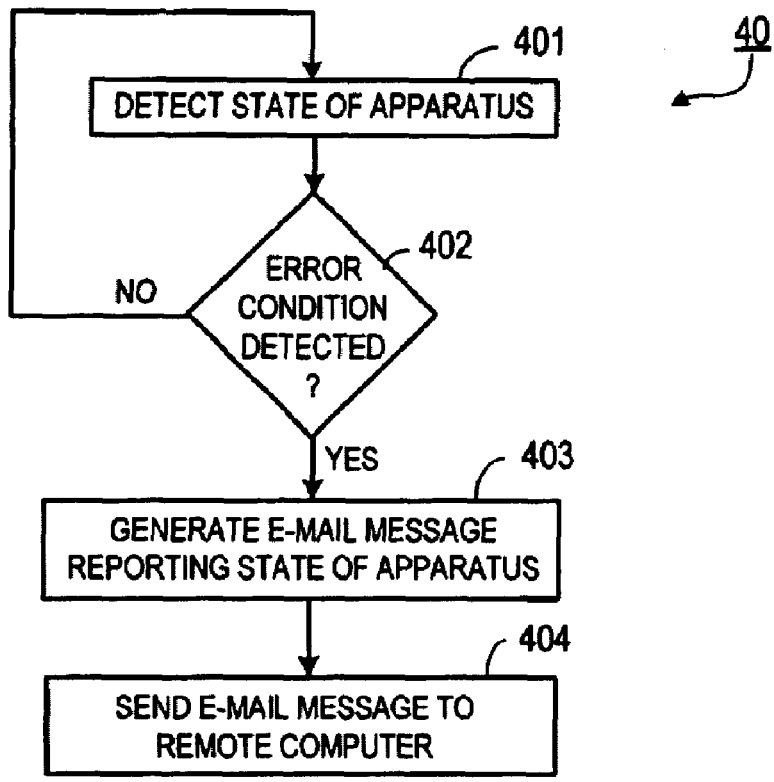
FIG. 4 is a flowchart of an alternative process performed by the embedded device to report the state of the apparatus to the remote computer.

FIG. 4 shows a process 40 by which embedded device 17 detects error conditions in apparatus 11 and sends an e-mail message to remote computer 16 when an error condition is detected. Process 40 detects (401) the state of apparatus 11, where, as above, "state" refers to tag variable values for apparatus 11. Detection (401) is performed in the same manner as process 36; therefore, a description is omitted here. Once process 36 has obtained the state of apparatus 11, process 36 determines (402) if that state represents an error condition.

To detect an error condition, process 40 may compare an obtained state variable value to a predetermined acceptable value or a range of predetermined acceptable values. If the state variable value is outside the range of, or deviates considerably from, the acceptable value(s), then process 40 knows that an error condition is present. Alternatively, process 40 may store each state variable value in memory 19 as it is obtained, and compare each newly-received state variable value to one or more stored state variable values. If the new state variable value deviates by more than a predetermined amount from the stored value(s), process 40 knows that an error condition is present/has occurred.

An error condition may be based on a single state variable value or it may be based on some combination of two or more state variable values. For example, if embedded device 17 is in manufacturing equipment that monitors both a level of fluid in a tank and a temperature of that fluid, an error condition may only be present if both the fluid level and the temperature exceed preset values. In this example, therefore, if only one state variable exceeds its corresponding preset value, then no error condition is present/has occurred.

If process 40 detects (402) an error condition, process 40 generates (403) an e-mail message and sends (404) the e-mail message to remote computer 16. The functions of generating and sending an e-mail message are performed as described above with respect to process 36; therefore, detailed descriptions are omitted here. When generating the e-mail message, e-mail program 25 may place the state variable(s) that caused the error condition in the "subject" line of the e-mail. If process 40 does not detect (402) an error condition, an e-mail message is not sent, whereafter process 40 returns to 401.

XML processor program 24 may maintain a log of error conditions in memory 19. This error condition "history" may be provided along with each new e-mail message. The history may relate to a particular state variable or to more than one state variable. For example, if the error condition pertains to temperature, XML processor program 24 may include the error condition history for temperature in the e-mail. If the error condition pertains to both temperature and tank level, XML processor program 24 may include the error condition history for both temperature and tank level in the e-mail. If a template is used to generate the e-mail message, portion(s) of that template may be reserved for error condition history.

Processes 36 and 40 can be combined to generate an e-mail periodically that reports the state of apparatus 11 to remote computer 16 even if no error conditions have been detected in apparatus 11, and that also flags any error conditions if any have been detected. XML processor program 24 adds an indicator or the like next to state variable values that correspond to error conditions.

Processes 36 and 40 may be executed by embedded device 17 to monitor and report on any type of state variables in any type of apparatus. For example, processes 36 and 40 may detect state variable values relating to conveyor belt speed, current and/or voltage in electronic devices, tank fluid levels, input/output sensors, and the like. Processes 36 and 40 may detect state variable values through a programmable logic controller (PLC) that is connected to one or more other devices. A PLC includes plug-in cards for each device that obtain and store device state variable values. OPC server program 21 communicates with these plug-in cards to obtain the device state variable values for generating e-mails as described above.

E-mails generated by processes 36 and 40 report the state of apparatus 11 using a self-describing computer language, such as XML; however, other types of self-describing computer languages may be used. In addition, other text and/or images may be included in the e-mails, if desired and appropriate under the circumstances. Described below is a process that is performed by remote computer 16 to interpret e-mails received from embedded device 17.

Processing in the Remote Computer

Remote computer 16 contains a controller 41 for executing software stored in memory 42. Among this software is e-mail program 44, XML parser 45, and customer relationship management (CRM) system software 46.

As in embedded device 17, e-mail program 44 is an SMTP-compliant program for receiving e-mail from embedded device 17 and other such devices. E-mail program 44 operates as a mail transfer agent (MTA) for e-mail messages arriving at remote computer 16 and a mail delivery agent (MDA) for e-mail messages originating from remote computer 16. E-mail program 44 uses the same protocol as e-mail program 25 in embedded device 17.

XML parser 45 parses XML code in a received e-mail to extract variable values, including an identifier for apparatus 11. XML parser 45 recognizes field names, such as "name"

and "value" from above and extracts corresponding state variable values from those fields. That is, XML parser 45 knows the syntax of XML. Knowing this, XML parser 45 is able to extract variable names from the "name" fields, corresponding variable values from the "value" fields, and any other information in the XML code.

XML parser 45 passes the state variable values, along with appropriate identifiers, to customer relationship management system software 46 or whatever other software or database requires/uses those state variable values.

Figure 5:
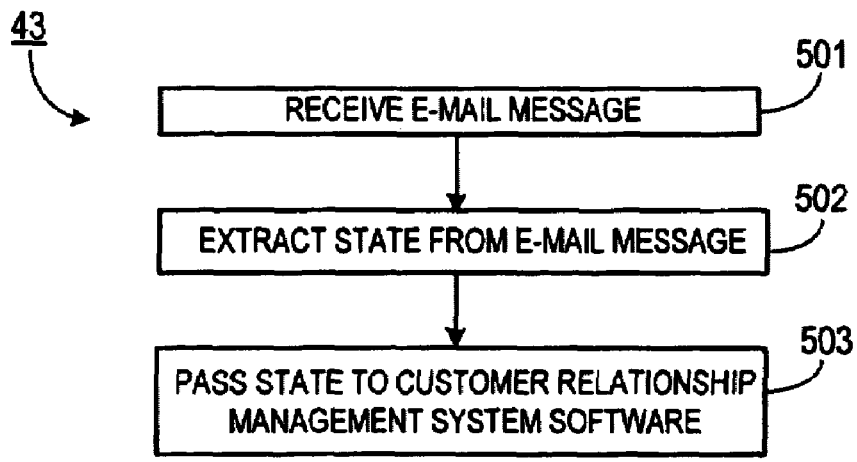
FIG. 5 is a flowchart of a process performed by the remote computer to interpret messages received from the embedded device.

FIG. 5 shows how an e-mail from embedded device 17 is processed (43). Once an e-mail has been received (501) from embedded device 17, XML parser 45 extracts (502) the state variable values of apparatus 11 from the e-mail. For example, XML parser 45 may extract tank levels, temperature values, etc., of apparatus 11 monitored by embedded device 17. The state variable values may be indicative of error conditions in apparatus 11, as defined above, or simply state variables for apparatus 11 obtained at a given point in time.

XML parser 45 passes (503) the state variable values, i.e., the state of apparatus 11, to customer relationship management system software 46. Customer relationship management system software 46 uses these state variable values, e.g., to schedule maintenance for apparatus 11 if necessary, to provide software upgrades to apparatus 11, or for any other purpose. Because the XML code in the e-mail is readable by XML parser 45, reporting and scheduling by customer relationship management system software 46 can be done automatically. It is noted that e-mail program 44 may still forward an e-mail to a customer representative, technician, or the like, particularly if an e-mail contains human-readable text.

The software on remote computer 16 is not limited to that shown in FIG. 1. For example, XML parser 45 may be replaced by a parser that is capable of parsing/reading other types of computer code, depending upon the code that is used in the received e-mail. Likewise, the parsed variables can be passed to software other than customer relationship management system software 46. For example, the variables can be stored in a database 47 for later use.

Alternative Embodiment

Figure 6:
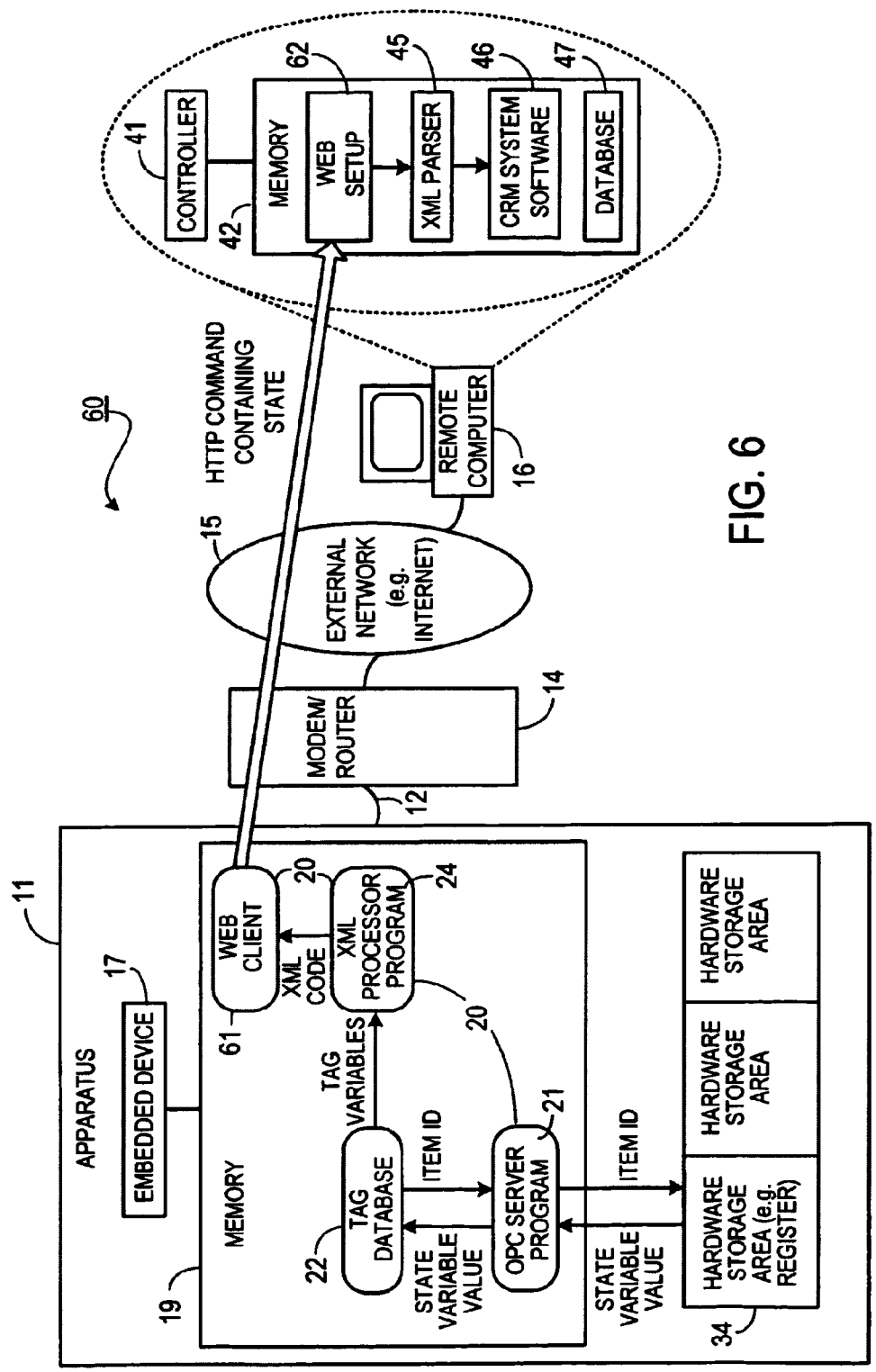
FIG. 6 is a block diagram of a network containing a remote computer and an apparatus having an embedded device the reports on the state of the apparatus using HTTP commands.

Referring to FIG. 6, a network 60 is shown on which an alternative embodiment of the invention is implemented. Network 60 is identical to network 10, except that e-mail program 25 in apparatus 11 is replaced by Web client 61 and e-mail program 44 in remote computer 16 is replaced by Web server 62. This alternative configuration allows embedded device 17 to transfer messages to remote computer 16 as HTTP commands rather than e-mails.

The HTTP command may be an HTTP POST command, although other HTTP commands, such as an HTTP GET command, may instead be used. An example of an HTTP POST command that uses XML code to report the status of a fictitious "widget" apparatus is as follows:

POST/CONTROL HTTP/1.1

Host: www.acme.com

Content-Type: text/xml

Content-length: nnn

<?xml version="1.0"?>

<root xmlns="urn:schemas-upnp-org:device-1-0">
　<specVersion>
　　<major>1</major>
　　<minor>0</minor>
　</specVersion>
　<device>
　　<deviceType>urn:www-acme-com:device:Widget:3</deviceType>
　　<friendlyName>Widget</friendlyName>
　　<manufacturer>Acme Industries</manufacturer>
　　<modelName>Widget</modelName>
　　<modelNumber>3</modelNumber>
　　<serialNumber>53266D</serialNumber>
　　<UDN>uuid:4A89EA70-73B4-11d4-80DF-0050DAB7BAC5</UDN>
　</device>
</root>

<parameters>
　<Airflow xsd:type="integer">378</Airflow>
　<Humidity xsd:type="double">46.7</Humidity>
　<Motor xsd:type="integer">1500</Motor>
　<Vent xsd:type="integer">4</Vent>
</parameters>

<alarms>
　<Temperature>
　　<description>Room temperature is above 83F</description>
　　<severity>300</severity>
　　<status>high</status>
　</Temperature>
</alarms>

XML is a self-describing computer language in the sense that fields in the XML code identify variables and their values in the XML code. For example, as shown in the above POST command, the "manufacturer" field identifies a manufacturer, e.g., "Acme Industries", and is delineated by "<manufacturer>" to indicate the start of the field and "</manufacturer>" to indicate the end of the field. XML is used in the HTTP command because it can be generated, parsed and read relatively easily by XML parser 45.

The HTTP POST command includes data identifying apparatus 11. This data includes, but is not limited to, data identifying the type of the device, a common (or "friendly") name for the device, the manufacturer of the device, the model name of the device, the model number of the device, the serial number of the device, and a universal unique identifier (UUID) for the device. In the example post command, this data is formatted as:

<friendlyName>Widget</friendlyName>
　<manufacturer>Acme Industries</manufacturer>
　<modelName>Widget</modelName>
　<modelNumber>3</modelNumber>
　<serialNumber>53266D</serialNumber>
　<UDN>uuid:4A89EA70-73B4-11d4-80DF-0050DAB7BAC5</UDN>

The HTTP POST command also provides the state of apparatus 11. The state includes operational parameters and alarm conditions for apparatus 11. In the above HTTP POST command, these are formatted as follows:

<parameters>
　　<Airflow xsd:type="integer">378</Airflow>
　　<Humidity xsd:type="double">46.7</Humidity>
　　<Motor xsd:type="integer">1500</Motor>
　　<Vent xsd:type="integer">4</Vent>
　</parameters>
　<alarms>

```
<Temperature>
    <description>Room temperature is above 83F</description>
    <severity>300</severity>
    <status>high</status>
</Temperature>
</alarms>
```

Thus, the state of the widget includes information on its airflow, humidity, motor and vent settings, temperature, severity of the temperature, and temperature status. Different information from that shown may be included in the HTTP POST command.

Referring back to FIGS. 3, 4 and 5, in this embodiment the operation of processes 36, 40 and 43 is identical to that described above, except that, in all steps, the e-mail message is replaced by an HTTP command. In apparatus 11, the HTTP command is generated by Web client 61 based on data provided by XML processor 24. This XML data is the same as that used above with e-mail program 25. Embedded device 17 sends the HTTP command to remote computer 16, where it is received by Web server 62 and then processed by XML parser 45. Thereafter, processing proceeds as above.

Architecture

Processes 36, 40 and 43 are not limited to use with the hardware/software configuration of FIG. 1; they may find applicability in any computing or processing environment. Processes 36, 40 and 43 may be implemented in hardware (e.g., an ASIC {Application-Specific Integrated Circuit} and/or an FPGA {Field Programmable Gate Array}), software, or a combination of hardware and software.

Processes 36, 40 and 43 may be implemented using one or more computer programs executing on programmable computers that each includes a processor, a storage medium readable by the processor (including volatile and non-volatile memory and/or storage elements), at least one input device, and one or more output devices.

Each such program may be implemented in a high level procedural or object-oriented programming language to communicate with a computer system. Also, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform processes 36, 40 and 43.

Processes 36, 40 and 43 may also be implemented as a computer-readable storage medium, configured with a computer program, where, upon execution, instructions in the computer program cause the computer to operate in accordance with processes 36, 40 and 43.

Other embodiments not described herein are also within the scope of the following claims. For example, e-mail or http messages sent from apparatus 11 to remote computer 16 may be queued (e.g., stored in memory 19) and then retrieved and sent out at a later time. Queuing messages reduces message loss resulting from intermittent system failures.

What is claimed is:

1. A method performed by a device associated with an apparatus to report a state of the apparatus to a remote computer, the device having a local network address that is unknown to the remote computer, the method comprising:
    detecting the state of the apparatus, wherein detecting is performed by monitoring variables associated with the apparatus, wherein monitoring comprises (a) obtaining identifiers for variables associated with the apparatus, the identifiers corresponding to storage locations for the apparatus, and (b) reading the variables from the storage locations;
    generating a message that reports the state of the apparatus to the remote computer, the message comprising a HyperText Transfer Protocol (HTTP) command, the message using eXtensible Markup Language (XML) to report the state, and the message containing a code that is unique to the device or apparatus, wherein generating is performed periodically or in response to a deviation in the state, and wherein generating comprises obtaining XML tags using the identifiers and incorporating the variables into fields delimited by XML tags that correspond to the variables; and
    sending the message comprising the HTTP command to the remote computer, the message comprising a one-way communication to the remote computer, wherein sending comprises sending the message once the message is generated or queuing the message and sending the message at a later time.

2. The method of claim 1, wherein detecting the state comprises reading the variables periodically from the storage locations.

3. The method of claim 1, further comprising determining the deviation in the state.

4. The method of claim 3, wherein determining comprises comparing the state to a previous state of the apparatus.

5. The method of claim 1, wherein the XML tags are part of a predefined template, the message being generated by:
    inserting the one or more variables into the template.

6. The method of claim 1, wherein the device is embedded in the apparatus.

7. The method of claim 1, wherein the message includes past states of the apparatus.

8. The method of claim 1, wherein the HTTP command comprises a POST command.

9. The method of claim 1, wherein the message comprises one or more of the following: data identifying a type of the device, a common name for the device, a manufacturer of the device, a model name of the device, a model number of the device, a serial number of the device, and a universal unique identifier for the device.

10. The method of claim 1, wherein the state comprises both an error condition and a measurement associated with the apparatus that is not an error condition.

11. The method of claim 1, wherein the storage locations comprise register locations corresponding to hardware associated with the apparatus.

12. One or more machine-readable media comprising instructions for execution by a device associated with an apparatus to report a state of the apparatus to a remote computer, the device having a local network address that is unknown to the remote computer, the instructions for causing the device to:
    detect the state of the apparatus, wherein detecting is performed by monitoring variables associated with the apparatus, wherein monitoring comprises (a) obtaining identifiers for variables associated with the apparatus, the identifiers corresponding to storage locations for the apparatus, and (b) reading the variables from the storage locations;
    generate a message that reports the state of the apparatus to the remote computer, the message comprising a HyperText Transfer Protocol (HTTP) command, the message using eXtensible Markup Language (XML) to report the state, the message containing a code that is unique to the device or apparatus, wherein generating is performed periodically or in response to a deviation in the state, and wherein generating comprises obtaining XML tags using the identifiers and incorporating the variables into fields delimited by XML tags that correspond to the variables; and send the message comprising the HTTP command to the remote computer, the message comprising a one-way communication to the remote computer, wherein sending comprises sending the message once the message is generated or queuing the message and sending the message at a later time.

13. The one or more machine-readable media of claim 12, wherein detecting the state comprises reading the variables periodically from the storage locations.

14. The one or more machine-readable media of claim 12, further comprising instructions that cause the device to:
determine the deviation in the state.

15. The one or more machine-readable media of claim 14, wherein determining comprises comparing the state to a previous state of the apparatus.

16. The one or more machine-readable media of claim 12, wherein the XML tars are part of a predefined template, the message being generated by:
inserting the one or more variables into the template.

17. The one or more machine-readable media of claim 12, wherein the device is embedded in the apparatus.

18. The one or more machine-readable media of claim 12, wherein the HTTP command comprises a POST command.

19. The one or more machine-readable media of claim 12, wherein the message comprises one or more of the following: data identifying a type of the device, a common name for the device, a manufacturer of the device, a model name of the device, a model number of the device, a serial number of the device, and a universal unique identifier for the device.

20. The one or more machine-readable media of claim 12, wherein the state comprises both an error condition and a measurement associated with the apparatus that is not an error condition.

21. The one or more machine-readable media of claim 12, wherein the storage locations comprise register locations corresponding to hardware associated with the apparatus.

22. A device associated with an apparatus for reporting a state of the apparatus to a remote computer, the device having a local network address that is unknown to the remote computer, the device comprising circuitry configured to:
detect the state of the apparatus, wherein detecting is performed by monitoring variables associated with the apparatus, wherein monitoring comprises (a) obtaining identifiers for variables associated with the apparatus, the identifiers corresponding to storage locations for the apparatus, and (b) reading the variables from the storage locations;
generate a message that reports the state of the apparatus to the remote computer, the message comprising a HyperText Transfer Protocol (HTTP) command, the message using eXtensible Markup Language (XML) to report the state, and the message containing a code that is unique to the device or apparatus, wherein generating is performed periodically or in response to a deviation in the state, and wherein generating comprises obtaining XML tags using the identifiers and incorporating the variables into fields delimited by XML tags that correspond to the variables; and send the message comprising the HTTP command to the remote computer, the message comprising a one-way communication to the remote computer, wherein sending comprises sending the message once the message is generated or queuing the message and sending the message at a later time.

23. The device of claim 22, wherein detecting the state comprises reading the variables periodically from the storage locations.

24. The device of claim 22, wherein the circuitry is configured to determine if the state of the apparatus has changed.

25. The device of claim 24, wherein determining if the state of the apparatus has changed comprises comparing the state to a previous state of the apparatus.

26. The device of claim 22, wherein the XML tags are part of a predefined template, the message being generated by:
inserting the one or more variables into the template.

27. The device of claim 22, wherein the circuitry comprises memory which stores executable instructions and a processor which executes the instructions.

28. The device of claim 22, wherein the circuitry comprises one or more of an application-specific integrated circuit and a programmable gate array.

29. The device of claim 22, wherein the device is embedded in the apparatus.

30. The device of claim 22, wherein the HTTP command comprises a POST command.

31. The device of claim 22, wherein the message comprises one or more of the following: data identifying a type of the device, a common name for the device, a manufacturer of the device, a model name of the device, a model number of the device, a serial number of the device, and a universal unique identifier for the device.

32. The device of claim 22, wherein the state comprises both an error condition and a measurement associated with the apparatus that is not an error condition.

33. The device of claim 22, wherein the storage locations comprise register locations corresponding to hardware associated with the apparatus.

34. A system comprising:
a first device comprising circuitry to generate a message reporting a state of an apparatus,
the message comprising a HyperText Transfer Protocol (HTTP) command, the message using eXtensible Markup Language (XML) to report the state, and the message containing an identifier that is unique to the apparatus,
the first device having a local network address that is unknown to a second device,
wherein reporting is performed following monitoring of variables associated with the apparatus,
wherein monitoring comprises (a) obtaining identifiers for variables associated with the apparatus, the identifiers corresponding to storage locations for the apparatus, and (b) reading the variables from the storage locations,
wherein generating is performed periodically or in response to a deviation in the state, and wherein generating comprises obtaining XML tags using the identifiers and incorporating the variables into fields delimited by XML tags that correspond to the variables, and
the message comprising a one-way communication to the remote computer, the first device sending the message once the message is generated or queuing the message and sending the message at a later time; and the second device comprising circuitry to receive the message from the first device and to relay content from the message to an external system.

35. The system of claim 34, wherein the circuitry in the second device is configured to extract the state of the apparatus from the message.

36. The system of claim 34, wherein the first device is embedded in the apparatus and the second device comprises a remote computer.

37. The system of claim 34, wherein the message includes a history log providing past states of the apparatus.

* * * * *